(12) United States Patent
Yao et al.

(10) Patent No.: US 8,059,660 B2
(45) Date of Patent: Nov. 15, 2011

(54) COMMUNICATIONS ROUTING SYSTEMS AND METHODS

(75) Inventors: Lei Yao, Great Falls, VA (US); Victor Gonzalez, Hamilton, VA (US)

(73) Assignee: Nextel Communications Inc., Reston, VA (US)

( * ) Notice: Subject to any disclaimer, the term of this patent is extended or adjusted under 35 U.S.C. 154(b) by 1147 days.

(21) Appl. No.: 11/111,771

(22) Filed: Apr. 22, 2005

(65) Prior Publication Data

US 2006/0239270 A1    Oct. 26, 2006

(51) Int. Cl.
    *H04L 12/28* (2006.01)
(52) U.S. Cl. .................................. 370/395.5; 370/351
(58) Field of Classification Search .................. 370/466,
    370/395.5, 409, 351, 389, 464, 465, 469,
    370/474; 709/238, 239, 240
    See application file for complete search history.

(56) References Cited

U.S. PATENT DOCUMENTS

| | | | | |
|---|---|---|---|---|
| 6,028,860 A | * | 2/2000 | Laubach et al. | 370/395.64 |
| 6,081,524 A | * | 6/2000 | Chase et al. | 370/389 |
| 6,205,149 B1 | * | 3/2001 | Lemaire et al. | 370/401 |
| 6,721,325 B1 | * | 4/2004 | Duckering et al. | 370/395.4 |
| 6,826,196 B1 | * | 11/2004 | Lawrence | 370/466 |
| 6,985,489 B2 | * | 1/2006 | Ando et al. | 370/395.5 |
| 7,020,143 B2 | * | 3/2006 | Zdan | 370/395.21 |
| 2002/0087716 A1 | * | 7/2002 | Mustafa | 709/236 |
| 2003/0081613 A1 | * | 5/2003 | Yamanaka | 370/395.21 |
| 2006/0140172 A1 | * | 6/2006 | Trainin | 370/352 |

* cited by examiner

*Primary Examiner* — Ricky Ngo
*Assistant Examiner* — David Oveissi

(57) ABSTRACT

Systems and methods for switching communications across different data link layer protocols are provided. A switch which supports a first data link layer protocol can support differentiated services for a second data link layer protocol without performing routing in the second data link layer protocol. The differentiated services are provided by mapping a connection of the first data link layer protocol onto one of a plurality of connections of a second data link layer protocol. The mapping of frames is based on the connection carrying the frames of the first data link layer protocol and a type of service associated with the frames. The frames of the first data link layer protocol are forwarded to another switch using one of a plurality of connections based on the mapping.

22 Claims, 6 Drawing Sheets

COMMUNICATIONS ROUTING SYSTEMS AND METHODS

BACKGROUND OF THE INVENTION

Wireless network operators typically rely upon backhaul transport networks from wireline carriers, such as Verizon, to provide a backhaul link for transmitting and receiving information between base sites and the network operator's core network. As used herein, a base site is a location where wireless base radios are located, and is also known in the art as a cell site. FIG. 1 illustrates a conventional system for connecting a wireless network operator's base sites to the core network. A wireless network operator typically operates a number of base sites 110a-110n whose information is aggregated by an asynchronous transfer mode (ATM) switch 120 of the backhaul transport network 150. ATM switch 120 transmits the aggregated information through the backhaul transport network 150 to another ATM switch 130. ATM switch 130 transmits the aggregated information to a mobile switching office (MSO) 140 in the wireless network operator's core network. The MSO also transmits information destined for base sites 110a-110n using the backhaul transport network 150. Aggregation by ATM is advantageous because it can utilize the multiplexing gain of multiple traffic flows. Accordingly, it can improve efficiency of the backhaul links and reduce the costs for wireless network operators.

Currently most wireless network operators employ a time division multiplexing (TDM) communication protocol between base sites 110a-110n and the backhaul transport network 150. TDM communication protocol can interoperate with ATM protocol. Some wireless network operators are considering implementation of an internet protocol-(IP) based core network and base sites. Accordingly, systems and methods which support both TDM and IP protocols on a backhaul between base sites and a wireless network operator's core network are necessary.

SUMMARY OF THE INVENTION

Systems and methods for switching of frames are provided. A switch which operates according to a first data link layer protocol receives a frame formatted in a second data link layer protocol. Based on an identification of the connection on which the switch receives the frame and a value in a type of service field of the frame, the switch selects one of a plurality of connections for transmitting the received frame to another switch which operates according to the first data link layer protocol. The second switch, based on the connection carrying the frame received from the first switch, selects a connection to a router.

In accordance with one embodiment of the present invention, a radio router, which operates according to a first data link layer protocol, employs a bridging module for forwarding frames to a switch, which operates according to a second data link layer protocol. A transceiver of the radio router receives packets of a first data link layer protocol and provides the packets to a processor. The processor generates frames in the first data link layer protocol and provides the frames to the bridging module over one of a plurality of connections.

The bridging module converts the frames from the first data link layer protocol to frames in the second data link layer protocol, and forwards the frame to a switch over one of another plurality of connections. The selection of which one of the another plurality of connections to forward the frames is based upon a type of service field, such as a differentiated services code point field, in the frame of the first data link layer protocol.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Because ATM and IP operate at different layers at the Open Systems Interconnection (OSI) protocol stack, any solution for supporting both TDM- and IP-based base sites must account for this difference. One technique for supporting TDM- and IP-based base sites is to provide a backhaul for the IP-based base sites which overlays the existing TDM-based backhaul. This technique provides separate switches and backhaul links for the TDM- and IP-based base sites. Because the backhaul links are typically leased by the wireless network operator, this technique can effectively double the backhaul cost.

Another technique for supporting TDM- and IP-based base sites is to provide IP routing capability for current ATM switches. Specifically, this technique performs IP routing on the ATM switches which interface with the IP-based base sites. IP routing would require costly upgrades to current ATM switches, and therefore, is undesirable. Additionally, IP routing can cause scalability issues because IP routing protocol can typically support several hundred nodes, while the backhaul network may require thousands of switches.

Figure 1:
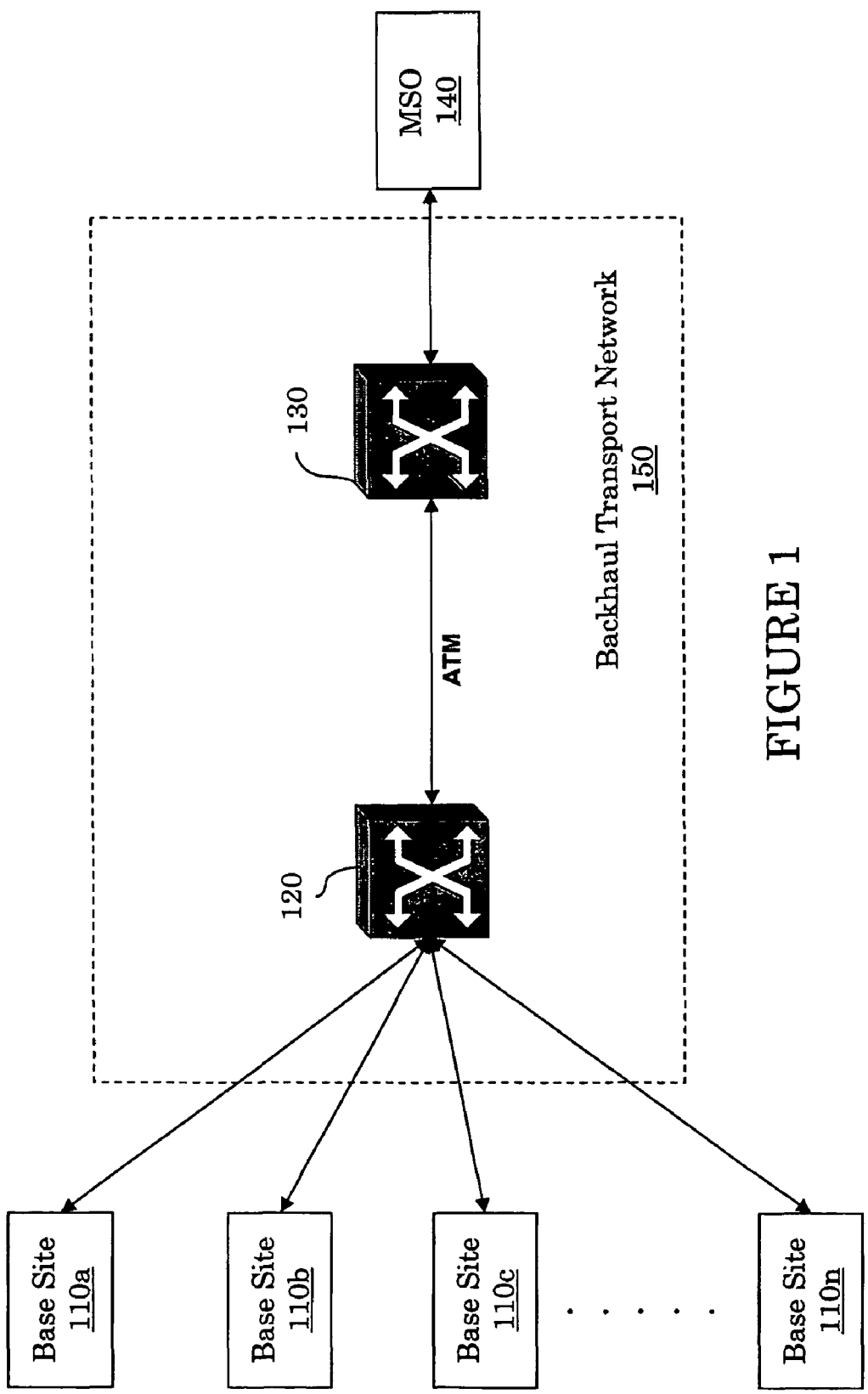
FIG. 1 illustrates a conventional system for connecting a wireless network operator's base sites to the core network.
Figure 2A:
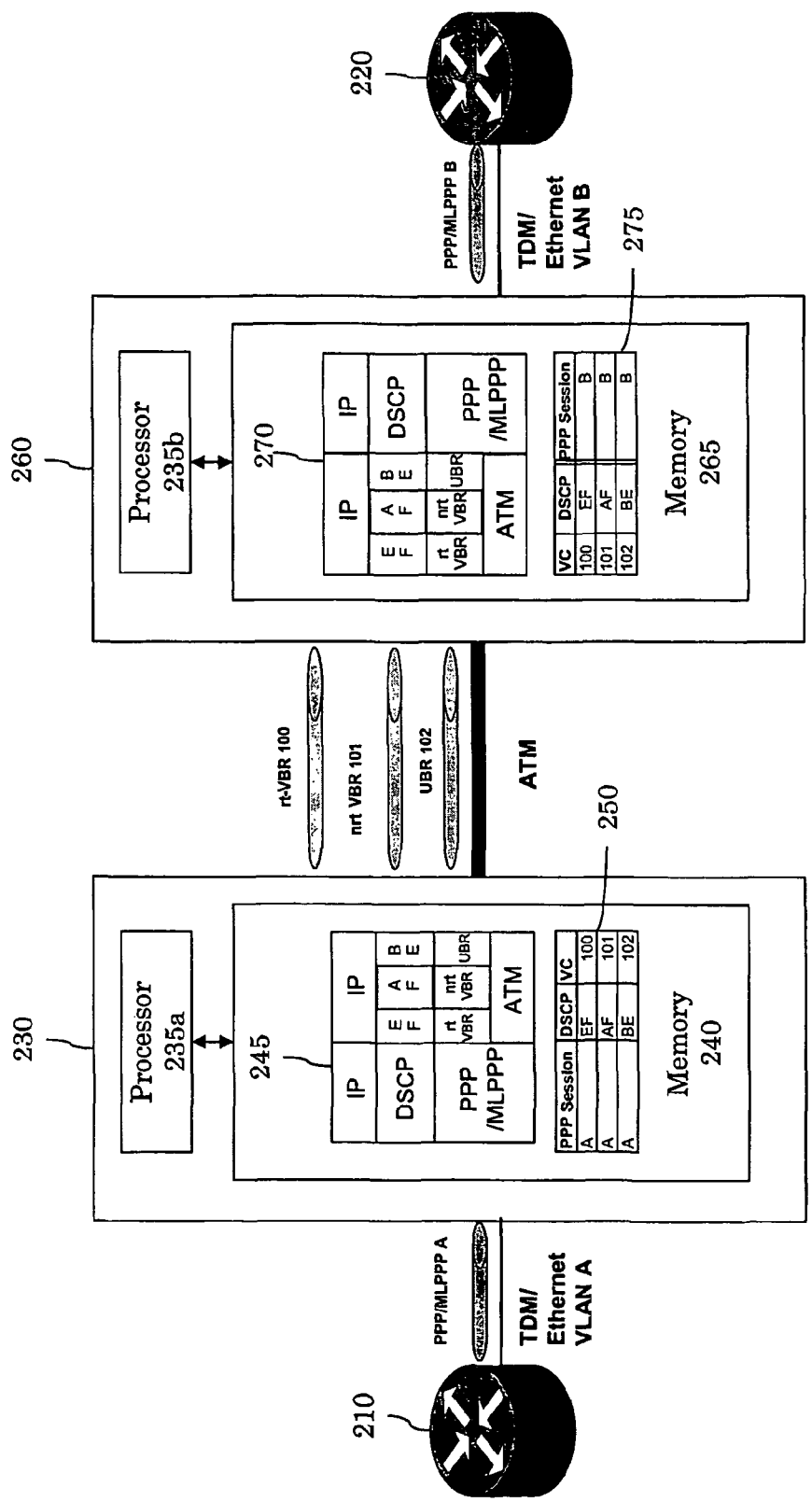
FIG. 2a illustrates an exemplary system for connecting a wireless network operator's base site to the core network in accordance with one embodiment of the present invention.

FIG. 2a illustrates an exemplary system for connecting a wireless network operator's base sites to the core network in accordance with one embodiment of the present invention. The system includes routers 210 and 220, and ATM switches 230 and 260. Routers 210 and 220 are respectively coupled to switches 230 and 260 via point-to-point/multi-link point-to-point (PPP/MLPPP) communication sessions over TDM communication links.

In accordance with exemplary embodiments of the present invention, router 210 is an IP-based radio router, which acts as a base transceiver station (BTS) and is coupled to a base site. The router 210 can communicate with wireless stations using any type of air-interface protocol. Information received by router 210 from the wireless stations is included in IP packets, which are sent over a communication link (e.g., a T1, T3, E1, or the like) to the wireless network operator's core network. As used herein, wireless stations include cellular telephones, personal digital assistants (PDAs), computers with wireless modems, or the like. These wireless stations can be stationary or mobile. Router 220 can be an aggregation router located, for example, in an MSO. Similar to router 210, router 220 is an IP-based router.

ATM switch 230 includes processor 235a and memory 240. Processor 235a can be a microprocessor, application specific integrated circuit (ASIC), field programmable gate array (FGPA), or the like. Memory 240 includes tables 245 and 250. ATM switch 260 is similar to ATM switch 230, except for the contents of the memory. Specifically, instead of including tables 245 and 250, the memory 265 of ATM switch 260 includes tables 270 and 275. Memories 240 and 265 can be solid state memory, flash memory, hard-disk drives, or the like.

Both ATM and IP provide for different handling of different types of traffic. IP provides differentiated services for different types of IP packets using a type of service (TOS) field in the IP packet header. The value in the type of service field is known in the art as the differentiated services code point (DSCP) value. IP differentiated services provides expedited forwarding (EF), assured forwarding (AF), best effort forwarding (BE) and the like types of service. ATM provides for different handling of different types of traffic using different virtual connections. ATM connections can be constant bit rate (CBR), real-time variable bit rate (rt-VBR), non-real time variable bit rate (nrt-VBR), available bit rate (ABR), and unspecified bit rate (UBR). Accordingly, the present invention maps frames encapsulating IP packets received from IP-based radio routers to ATM connections based on the value in the type of service field of the IP header. Additionally, because the ATM switches may support more than one IP-based radio router, the present invention also performs the mapping based upon the layer-2 connection carrying the IP packets.

Tables 245 and 250 illustrate an exemplary mapping of IP differentiated services to ATM connection types. Specifically, EF frames associated with PPP session A are mapped into rt-VBR virtual connection 100, AF frames associated with PPP session A are mapped into nrt-VBR virtual connection 101, and BE frames associated with PPP/MLPPP connection A are mapped into UBR connection 102.

Switch 230 performs a similar mapping for frames received from switch 260 over the plurality of virtual connections. Specifically, based upon the virtual connection on which the frame is received from switch 260, switch 230 will set the type of service value of the IP packet and place the corresponding frame on a PPP/MLPPP session based on the mapping tables. Alternatively, instead of the switch 230 setting the type of service value, this value can be set by router 220 before the packet is sent to switch 260.

Switch 260 performs similar mapping to that described above in connection with switch 230. Specifically, switch 260 maps frames received over one of the plurality of virtual connections onto a particular PPP/MLPPP session. Similarly, switch 260 maps frames received from aggregation router 220 onto one of the plurality of virtual connections based upon which PPP session carried the frame and the value in the type of service field in the IP header of the frame.

Because switches 230 and 260 are ATM switches, these switches can switch TDM frames between the MSO and the conventional base sites using conventional switching techniques. Although FIG. 2 illustrates the mapping being performed by the main processor and memory of the ATM switch, the mapping can be performed by a separate processor and memory, an ASIC, FPGA, or the like.

Figure 2B:
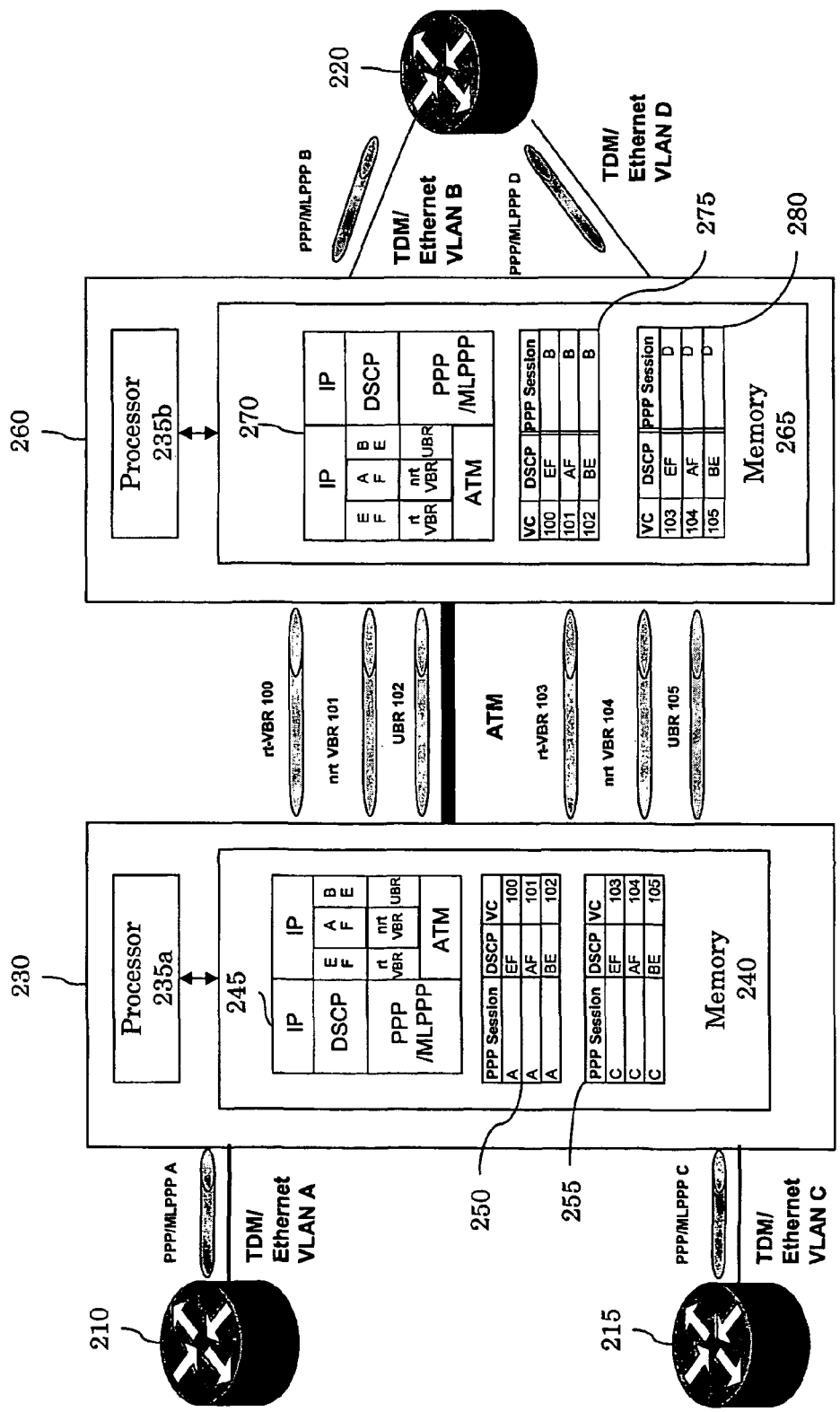
FIG. 2b illustrates an exemplary system for connecting a number of base sites to the core network in accordance with one embodiment of the present invention.

As discussed above, ATM switch 230 may support a number of IP-based radio routers. FIG. 2b illustrates an exemplary system for connecting a number of base sites to the core network in accordance with the present invention. The mapping performed for information received from radio router 210 will be similarly performed for other radio routers coupled to ATM switch 230. For example, another radio router 215 may have a PPP/MLPPP session C with ATM switch 230. Like PPP/MLPPP session A, PPP session C can include DSCP values EF, AF and BE. Accordingly, memory 240 includes table 255 for mapping frames carried on PPP session C onto rt-VBR 103, nrt-VBR 104 and UBR 105 connections between ATM switches 230 and 260. Similarly, memory 265, includes table 280 for mapping frames carried on connections rt-VBR 103, nrt-VBR 104 and UBR 105 onto PPP/MLPPP D.

Figure 3:
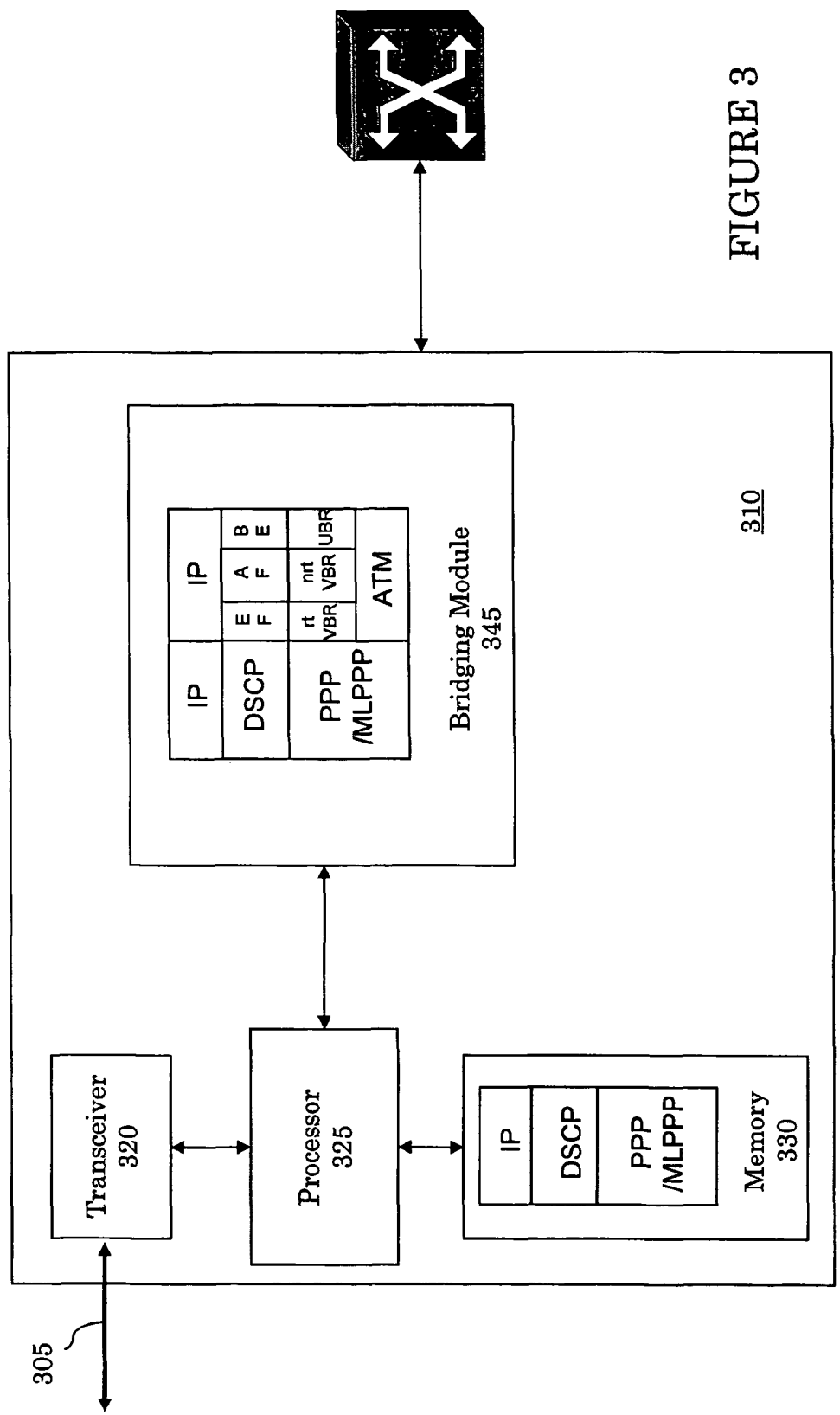
FIG. 3 illustrates an exemplary system for connecting a wireless network operator's base sites to the core network in accordance with another embodiment of the present invention.

FIG. 3 illustrates an exemplary system for connecting a wireless network operator's base sites to the core network in accordance with another embodiment of the present invention. In accordance with this embodiment, the mapping is performed by a bridging module in the radio router. The radio router 310 includes a transceiver 320, processor 325, memory 330 and bridging module 345.

The transceiver 320 is coupled for bidirectional communication with one or more wireless stations (not illustrated) over communication link 305. Although FIG. 3 illustrates only a single communication link 305, more than one communication link can be used to couple the transceiver 320 with the one or more wireless stations. The one or more communication links can be 802.11, CDMA, TDMA, iDEN, GSM, Bluetooth, WiMax, or the like.

The processor 325 receives IP packets from one or more wireless stations and establishes a PPP/MLPPP connection with bridging module 345. The processor 325, using the memory 330, generates frames for transmission to the bridging module 345. The bridging module 345 receives frames carried on a PPP/MLPPP connection and maps the frames into one of a plurality of ATM virtual connections. Because there is a single PPP session, the mapping is based only on a value in the type of service field of the IP frame. The bridging module 345 can be implemented as a processor with associated memory, ASIC, FPGA, or the like. Moreover, the bridging module need not be a component of the radio router 310, but instead can be located anywhere between the radio router 310 and an ATM switch.

Figure 4:
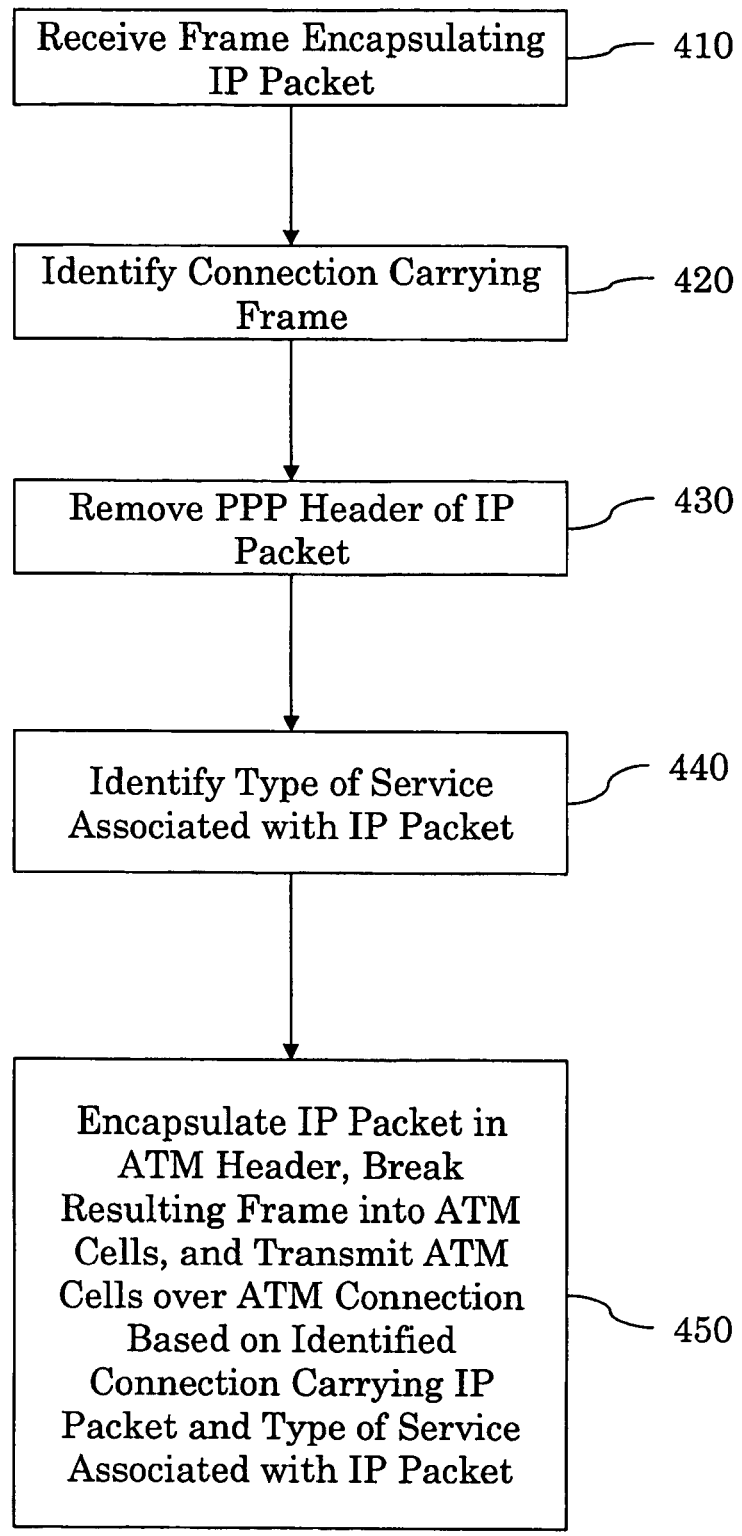
FIG. 4 illustrates an exemplary method for forwarding information from base sites to a wireless network operator's backhaul transport network in accordance with the present invention.

FIG. 4 illustrates an exemplary method for forwarding information from base sites to a backhaul transport network in accordance with the present invention. A switch, such as an ATM switch, receives a frame encapsulating an IP packet (step 410) and identifies a connection which carried the frame (step 420). The switch then removes the PPP header of the frame in order to examine the IP packet (step 430). The switch identifies a type of service associated with the IP packet by examining the type of service field of the IP packet (step 440). The switch then encapsulates the IP packet in an ATM header, breaks the resulting frame into ATM cells, and transmits the ATM cells over an ATM connection based on the identified connection carrying the IP packet and a type of service associated with the IP packet (step 450).

Figure 5:
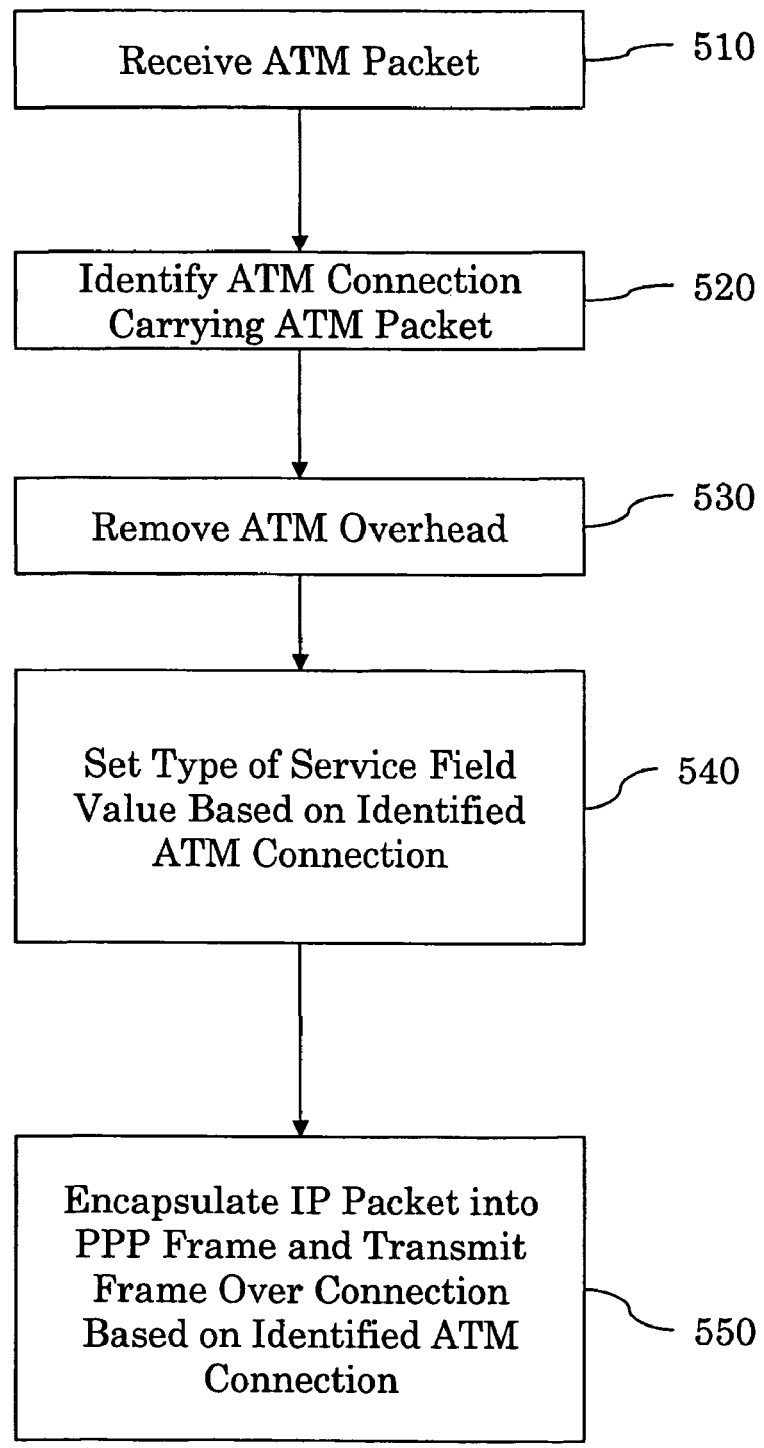
FIG. 5 illustrates an exemplary method for forwarding information from a backhaul transport network to a wireless network operator's core network in accordance with the present invention.

FIG. 5 illustrates an exemplary method for forwarding information from a backhaul transport network to a wireless network operator's core network in accordance with the present invention. An ATM switch receives an ATM frame from another ATM switch (step 510) and identifies the ATM connection carrying the ATM frame (step 520). The switch removes the ATM overhead from the ATM frame (step 530). The switch then sets the type of service field based on the identified ATM connection (step 540). Alternatively, the type of service field can be set. The switch encapsulates the packet into a PPP frame and transmits the IP frame over a particular connection based on the identified ATM connection (step 550).

Although exemplary embodiments have been described above in connection with a mapping between PPP/MLPPP and ATM connections, the present invention is applicable to any type of system where it is desired to bridge different types of layer 2 technologies while providing differentiated services. For example, instead of a PPP/MLPPP connection between an ATM switch and an aggregation router, an Ethernet connection can be employed. Additionally, other types of protocols and switches other than ATM can be employed so long as the protocol supports some type of technique for providing different handling for different types of data.

Although exemplary embodiments have been described in connection with particular class of service types, the present invention is equally applicable to other class of service types. For example, instead of using the DSCP value, the entire TOS byte can be used. Alternatively, the IP precedence bits, i.e., the first three bits in the TOS byte can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for switching communications, the method comprising the acts of:
   receiving, by a first switch from a radio router, a first frame associated with a first data link layer protocol on a first connection, wherein the first frame includes a type of service value in a header of the first frame that is set by the radio router and wherein the type of service value associated with the first frame is one of an assured forwarding, expedited forwarding, and best effort;
   forming a second frame from the first frame according to a second data link layer protocol;
   selecting one of a plurality of connections for transmitting the second frame based on an identification of the first connection and the type of service value in the header of the first frame, wherein each of the plurality of connections is associated with a distinct type of service,
      wherein the distinct type of service of the plurality of connections comprises real-time variable bit rate, non-real time variable bit rate, constant bit rate, available bit rate, and unspecified bit rate connections, and
      wherein selecting one of the plurality of connections comprises mapping the assured forwarding type of service value to the non-real time variable bit rate connection;
   transmitting the second frame over the selected one of the plurality of connections to a second switch, wherein the first and second data link layer protocols are different data link layer protocols,
   receiving, by the first switch, a third frame associated with a third data link layer protocol on the first connection, wherein a header of the third frame includes a different type of service value than the header of the first frame;
   forming a fourth frame from the third frame according to a fourth data link layer protocol;
   selecting one of the plurality of connections for transmitting the fourth frame based on the identification of the first connection and the type of service value in the header of the third frame, wherein the one of the plurality of connections selected for the fourth frame is a different connection than the one selected for the second frame; and
   transmitting the fourth frame to the second switch over the selected one of the plurality of connections, wherein the third and fourth data link layer protocols are different data link layer protocols.

2. The method of claim 1, wherein the first data link layer protocol of the first frame is point-to-point protocol (PPP) and the second data link layer protocol of the second frame is an asynchronous transfer mode (ATM) protocol.

3. The method of claim 1, wherein the data link layer protocol of the first frame is an Ethernet protocol and the data link layer protocol of the second frame is an asynchronous transfer mode (ATM) protocol.

4. The method of claim 1, wherein the act of forming the second frame comprises the acts of:
   removing a data link layer header of the first frame; and
   adding a data link layer header to the first frame to form the second frame.

5. A method for switching communications, the method comprising the acts of:
   receiving, by a switch, a first frame associated with a first data link layer protocol;
   identifying a connection carrying the first frame and a type of service of the connection, wherein the identified connection is one of a plurality of connections, each of which is associated with a distinct type of service, wherein distinct type of service of the plurality of connections includes real-time variable bit rate, non-real time variable bit rate, constant bit rate, available bit rate, and unspecified bit rate connections;
   forming a second frame from the first frame according to a second data link layer protocol, the second frame including a type of service value, wherein the type of service value is one of assured forwarding, expedited forwarding and best effort;
   setting, by a radio router, the type of service value of the second frame based on the identified connection and the type of service of the connection, wherein the first frame is mapped to the second frame based on the second data link layer protocol, wherein when the first frame type of service connection is the non-real time variable bit rate connection, the second frame type of service is the assured forwarding type of service;
   transmitting the second frame on a first connection based on the identified connection, wherein the first and second data link layer protocols are different data link layer protocols,
   receiving, by a switch, a third frame associated with a third data link layer protocol;
   identifying a connection carrying the third frame and a type of service of the connection, wherein the identified connection carrying the third frame is one of the plurality of connections;
   removing overhead information from the third frame;
   forming a fourth frame from the third frame with the removed header;
   setting a type of service of the fourth frame based on the identified connection and the type of service of the connection, wherein the third frame is mapped to the fourth frame based on the fourth data link layer protocol; and transmitting the fourth frame on a second connection based on the identified connection, wherein the connection carrying the third frame is a different connection than that carrying the first frame.

6. The method of claim 5, wherein the data link layer protocol of the first frame is an asynchronous transfer mode (ATM) protocol and the data link layer of the second frame is a point-to-point protocol (PPP).

7. The method of claim 5, wherein the data link layer protocol of the first frame is an asynchronous transfer mode (ATM) protocol and the data link layer protocol of the second frame is an Ethernet protocol.

8. The method of claim 5, further comprising the acts of:
forming a fourth frame from the third frame with the removed header according to a fourth data link layer protocol; and
transmitting the fourth frame on the first connection based on the identified connection, wherein the connection carrying the third frame is a different connection than that carrying the first frame and the type of service value is set to a first value for the second frame and a second value for the fourth frame.

9. The method of claim 8, wherein the type of service value of the fourth frame is set by a switch.

10. The method of claim 8, wherein the type of service value of the fourth frame is set by a radio router.

11. The method of claim 8, wherein the first connection couples the switch with a radio router.

12. The method of claim 5, wherein the second frame is transmitted to a first radio router and the fourth frame is transmitted to a second radio router.

13. An apparatus, comprising:
a processor, as part of a switch, which selects one of a plurality of connections for transmitting a first frame associated with a first data link layer protocol received on a first connection, wherein the first frame includes a type of service value in a header of the first frame and wherein the type of service value associated with the first frame is one of an assured forwarding, expedited forwarding and best effort; and
a memory coupled to the processor, wherein the processor forms a second frame from the first frame according to a second data link layer protocol,
selects one of the plurality of connections for transmitting the second frame based on an identification of the first connection and the type of service value in the header of the first frame using information stored in the memory, wherein each of the plurality of connections is associated with a distinct type of service and the first and second data link layer protocols are different data link layer protocols, wherein the plurality of connections include real-time variable bit rate, non-real time variable bit rate, constant bit rate, available bit rate, and unspecified bit rate connections, and wherein selecting one of the plurality of connections comprises mapping the assured forwarding type of service value to the non-real time variable bit rate connection,
selects another one of a plurality of connections for transmitting a third frame associated with a third data link layer protocol received on the first connection, wherein the third frame includes a different type of service value than the header of the first frame, and forms a fourth frame from the third frame according to a fourth data link layer protocol, selects one of the plurality of connections for transmitting the fourth frame based on the identification of the first connection and the type of service value in the header of the third frame using information stored in the memory, wherein each of the plurality of connections is associated with a distinct type of service and the third and fourth data link layer protocols are different data link layer protocols, and wherein the one of the selected one of the plurality of connections is a different connection that the one selected for the second frame.

14. The apparatus of claim 13, wherein the data link layer protocol of the first frame is a point-to-point protocol (PPP) and the data link layer protocol of the second frame is an asynchronous transfer mode (ATM) protocol.

15. The apparatus of claim 13, wherein the data link layer protocol of the first frame is an Ethernet protocol and the data link layer protocol of the second frame is an asynchronous transfer mode (ATM) protocol.

16. An apparatus, comprising:
a processor, that is a component of a switch, which identifies a connection carrying a first frame associated with a first data link layer protocol and type of service of the connection, wherein the identified connection is one of a plurality of connections, each of which is associated with a distinct type of service, and forms a second frame from the first frame according to a second data link layer protocol, the second frame including a type of service value, wherein the plurality of connections include real-time variable bit rate, non-real time variable bit rate, constant bit rate, available bit rate, and unspecified bit rate connections; and
a memory coupled to the processor, wherein the processor sets the type of service value of the second frame based on the identified connection and type of service of the first connection, wherein the first frame is mapped to the second frame based on the second data link layer protocol using information stored in the memory, wherein the first and second data link layer protocols are different data link layer protocols and wherein the type of service is one of assured forwarding, expedited forwarding and best effort, and wherein when the first frame type of service connection is the non-real time variable bit rate connection, the second frame type of service is the assured forwarding type of service,
wherein the processor identifies a connection carrying a third frame associated with a third data link layer protocol and type of service of the connection, wherein the identified connection is one of the plurality of connections different from the connection carrying the first frame, and forms a fourth frame from the third frame according to a fourth data link layer protocol, the fourth frame including a type of service value; and
wherein the processor sets the type of service value of the fourth frame based on the identified connection and type of service of the third connection, wherein the third frame is mapped to the fourth frame based on the fourth data link layer protocol using information stored in the memory, wherein the third and fourth data link layer protocols are different data link layer protocols.

17. The apparatus of claim 16, wherein the data link layer protocol of the first frame is an asynchronous transfer mode (ATM) protocol and the data link layer of the second frame is point-to-point protocol (PPP).

18. The apparatus of claim 16, wherein the data link layer protocol of the first frame is an asynchronous transfer mode (ATM) protocol and the data link layer protocol of the second frame is an Ethernet protocol.

19. The apparatus of claim 16, wherein the switch is coupled to another switch by the connection carrying the first frame.

20. The apparatus of claim 16, wherein the switch transmits the second frame to a router.

21. The apparatus of claim 20, wherein the router is a radio router.

22. The apparatus of claim 20, wherein the router is an aggregation router.

* * * * *